United States Patent [19]
Lohr

[11] Patent Number: 5,758,583
[45] Date of Patent: Jun. 2, 1998

[54] UNIT FOR DIRECTIONALLY GUIDING A TRANSPORT VEHICLE ALONG A RAIL

[75] Inventor: Robert Lohr, Hangenbieten, France

[73] Assignee: Lohr Industrie, S.A., Hangenbieten, France

[21] Appl. No.: 545,773

[22] PCT Filed: May 25, 1994

[86] PCT No.: PCT/FR94/00612

§ 371 Date: Jan. 29, 1996

§ 102(e) Date: Jan. 29, 1996

[87] PCT Pub. No.: WO94/27854

PCT Pub. Date: Dec. 8, 1994

[30] Foreign Application Priority Data

May 26, 1994 [FR] France ................... 93 06491

[51] Int. Cl.⁶ ............................................... B61C 13/00
[52] U.S. Cl. .................... 105/72.2; 104/244; 104/245; 297/7; 180/401
[58] Field of Search ................... 105/72.2, 215.2; 104/243, 244, 245; 297/7; 180/401

[56] References Cited

U.S. PATENT DOCUMENTS

| | | | |
|---|---|---|---|
| 3,180,280 | 4/1965 | Kuch et al. | 104/245 |
| 3,363,584 | 1/1968 | Brush et al. | 104/244 |
| 3,410,223 | 11/1968 | Miller | 104/244 |
| 3,853,069 | 12/1974 | Goodwin | 104/245 |
| 4,454,819 | 6/1984 | Cuylits et al. | 104/245 |
| 5,183,952 | 2/1993 | Low | 105/72.2 |
| 5,186,109 | 2/1993 | Madison | 105/72.2 |
| 5,289,778 | 3/1994 | Romine | 105/72.2 |

FOREIGN PATENT DOCUMENTS

| | | | |
|---|---|---|---|
| 062370 | 10/1982 | European Pat. Off. | |
| 496236 | 1/1992 | European Pat. Off. | |
| 513374 | 10/1920 | France | |
| 514718 | 11/1920 | France | |
| 804191 | 10/1936 | France | 295/7 |
| 1128765 | 4/1962 | Germany | |
| 1161157 | 1/1964 | Germany | |
| 1455512 | 3/1969 | Germany | |
| 2356207 | 5/1975 | Germany | |

*Primary Examiner*—S. Joseph Morano
*Attorney, Agent, or Firm*—Davis and Bujold

[57] ABSTRACT

A unit for automatically guiding a vehicle along a rail comprising an arm (2) hingedly mounted, via a universal joint, to an end (3) of a chassis. The arm (2) includes, at a front end thereof, a mechanism for rolling (7, 8) along a rail (9) which comprises a pair of rollers (35, 36) mounted in a V-shaped configuration to encompass the rail (9) by lateral rolling engagement along each flank of the rollers. The unit is also provided with an arm raising mechanism, a mechanical coupling to the steering mechanism of the vehicle and various sensors. The invention is primarily applicable for the manufacture and use of urban public transport vehicles.

19 Claims, 8 Drawing Sheets

UNIT FOR DIRECTIONALLY GUIDING A TRANSPORT VEHICLE ALONG A RAIL

FIELD OF THE INVENTION

The invention relates to an assembly for the directional self-guidance of a road vehicle along a rail.

TECHNOLOGICAL BACKGROUND TO THE INVENTION

At the present time, attempts are being made in the urban environment to bring about an economical reduction in the ground space taken up by public transit means.

To this end, devices have been created which enable urban public transit vehicles to be guided for the whole of their journey, or at least for part of it.

These devices offer a guarantee of being able to reduce the width of the lanes or corridors reserved for the passage of these vehicles.

Furthermore, the driver of the vehicle is constantly and fully occupied by driving, which entails increasing and excessive fatigue to the point of exhaustion, and consequently an increased risk of accidents.

The guidance of the vehicle over at least part of the journey enables the driver to be entrusted with a role of surveillance and monitoring that is less tiring, more prestigious and more useful to the service.

In general terms, a choice between electronic guidance systems and mechanical systems exists.

Mechanical systems are often preferred, as they offer various advantages, owing notably to their simplicity, reliability and, finally, their cost.

The mechanical guidance devices that currently exist do, however, present numerous inadequacies, which undermine their development.

Notably, these devices are not designed to be installed on vehicles with independent front wheels. However, the use of a rigid axle is impossible in the case of vehicles with a lowered floor, while this feature is a major requirement of municipal authorities, for reasons of ease of access and safety.

Equally, the current devices do not provide protection against derailment.

For example, according to European patent 0 062 370, in the name of Constructions FERROVIAIRES et METALLIQUES, a self-guidance assembly for a vehicle is known which comprises two arms, each carrying a roller. This system is adapted to a hollow rail and requires fully dedicated steering. Its two associated guide arms, mounted directly on the steering, make flexible, jolt-free driving difficult.

Another example embodiment is described in European patent 0 496 236 in the name of ADIGAN Research. A guide arm carrying a sliding member is mounted beneath a vehicle, and fits into a hollow rail provided in the roadway.

The device has no rotating roller, and there is thus a risk of extraneous screeching and whining. In addition, it is not protected against derailment. This device is subject to rapid wear, leading to imprecision and maladjustment of the guidance.

OBJECTIVES OF THE INVENTION

The aim of the invention is to overcome these drawbacks by proposing an assembly for the directional self-guidance of a road vehicle along a profiled rail, able to be activated in a permanent or temporary fashion.

SUMMARY OF THE INVENTION

The directional self-guidance assembly according to the invention consists of a pivoting, retractable arm, installed at the front of a road vehicle, carrying two rollers inclined towards each other, with a special peripheral profile gripping a rail of adapted shape.

The self-guidance assembly according to the invention has numerous advantages:

the inclined rollers prevent any sudden derailment. The inclining of the rollers assists guidance operations on entering an area by virtue of the possibility of using the outer faces of the said rollers;

the rollers have a low loading, leading to reduced wear, and are mounted on elastic hubs to reduce noise;

the homogeneous steering/guidance assembly is compatible with the use of independent front wheels, and enables the natural capacity of the hydraulically-assisted steering box to filter out vibrations from the wheels to be used;

the control and safety device of the system is provided by an automatic controller, and enables a so-called "dead man's" system to be installed;

the rail, which receives low loading, can therefore be fixed to the ground by means of an elastic or laminated backing that reduces the noise level.

BRIEF DESCRIPTION OF THE DRAWINGS

Other characteristics and advantages of the invention will appear in the description which follows, given by way of example and accompanied by the drawings which depict.

DETAILED DESCRIPTION OF THE EMBODIMENTS ILLUSTRATED

Figure 1:
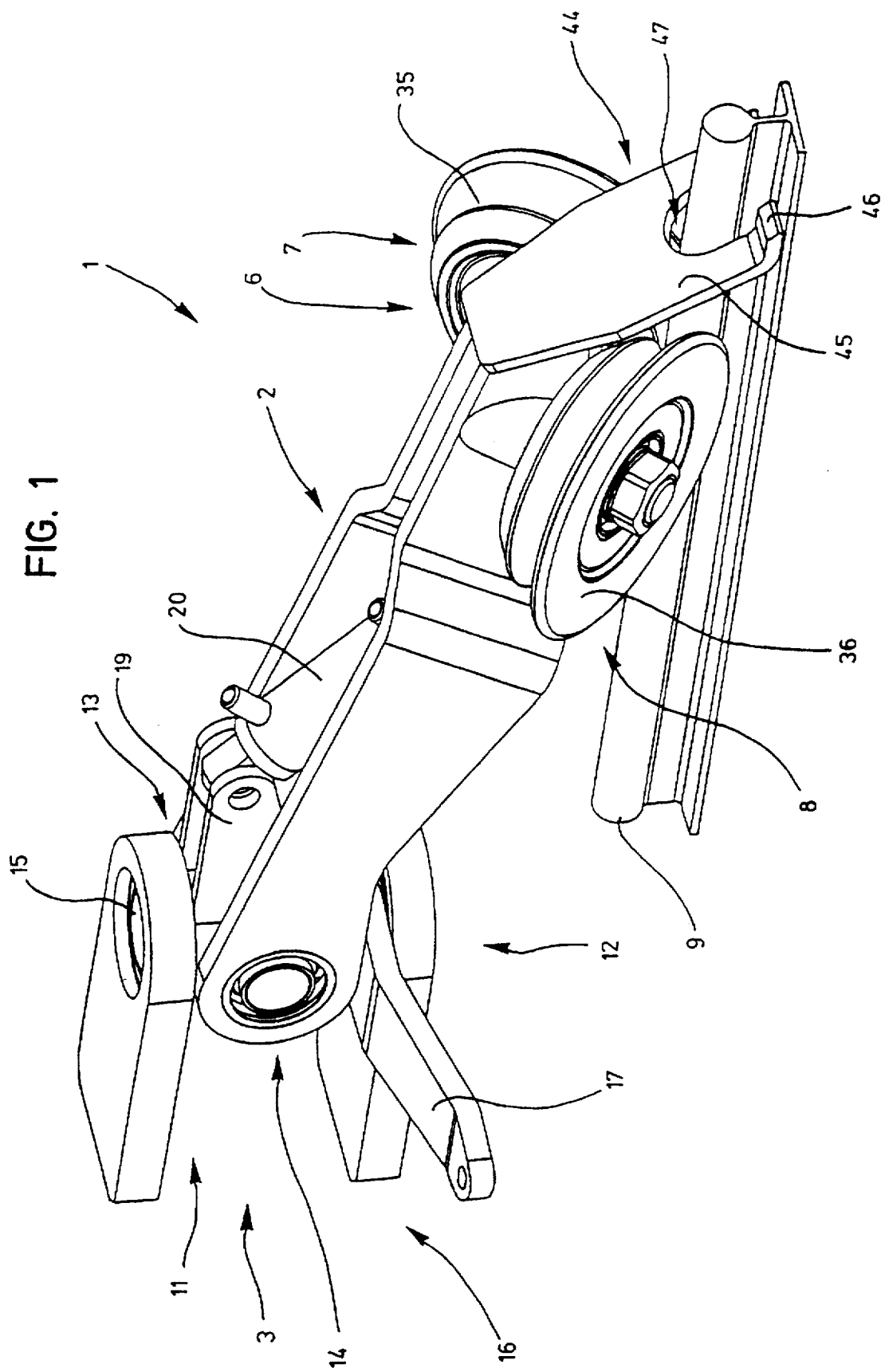
FIG. 1: a general perspective view of the front of a self-guidance assembly according to the invention, in its position of operation along a rail.

The general inventive idea consists of guiding the vehicle by means of a raisable articulated assembly having a head with two running means gripping the guide rail.

The figures depict a directional self-guidance assembly 1 according to the invention.

It comprises essentially a raisable guide arm 2 pivotally mounted on an end element 3 of the chassis 4 of a road vehicle 5, of which only the elements significant for the invention are depicted. This guide arm 2 has at its front end a running head 6 equipped with running means 7, 8 designed to follow a path, preferably embodied by a rail 9, projecting, that is to say fixed to the roadway, or at the bottom of a groove or channel 10 formed in the roadway.

More particularly, the guide arm 2 is pivotally mounted on a structure at the front end 11 of the chassis by an articulation 12 of the universal joint type formed by a guide pivot 13 and a tilting pivot 14 with crossed axes allowing pivoting movements in two crosswise planes, for example vertical and horizontal.

The axis 15 of the guide pivot 13 is mounted at the end of a fork 16 fixed to the end of the chassis. The body of the guide pivot has at its bottom a lateral extension forming a lateral control lever 17 on which there is articulated a return rod 18, and at the top a clevis 19 on which there is pivotally mounted by one of its ends a raising cylinder 20.

The tilting of the whole guide arm is effected through the action of the raising cylinder causing the arm to pivot about the axis of the tilting pivot.

This guide arm is designed to control the front steering unit 21, for example with independent wheels 22, 23, of the road vehicle, by means of its variations in angular position. To this end, it acts through its control lever on the steering linkage.

Figure 7:
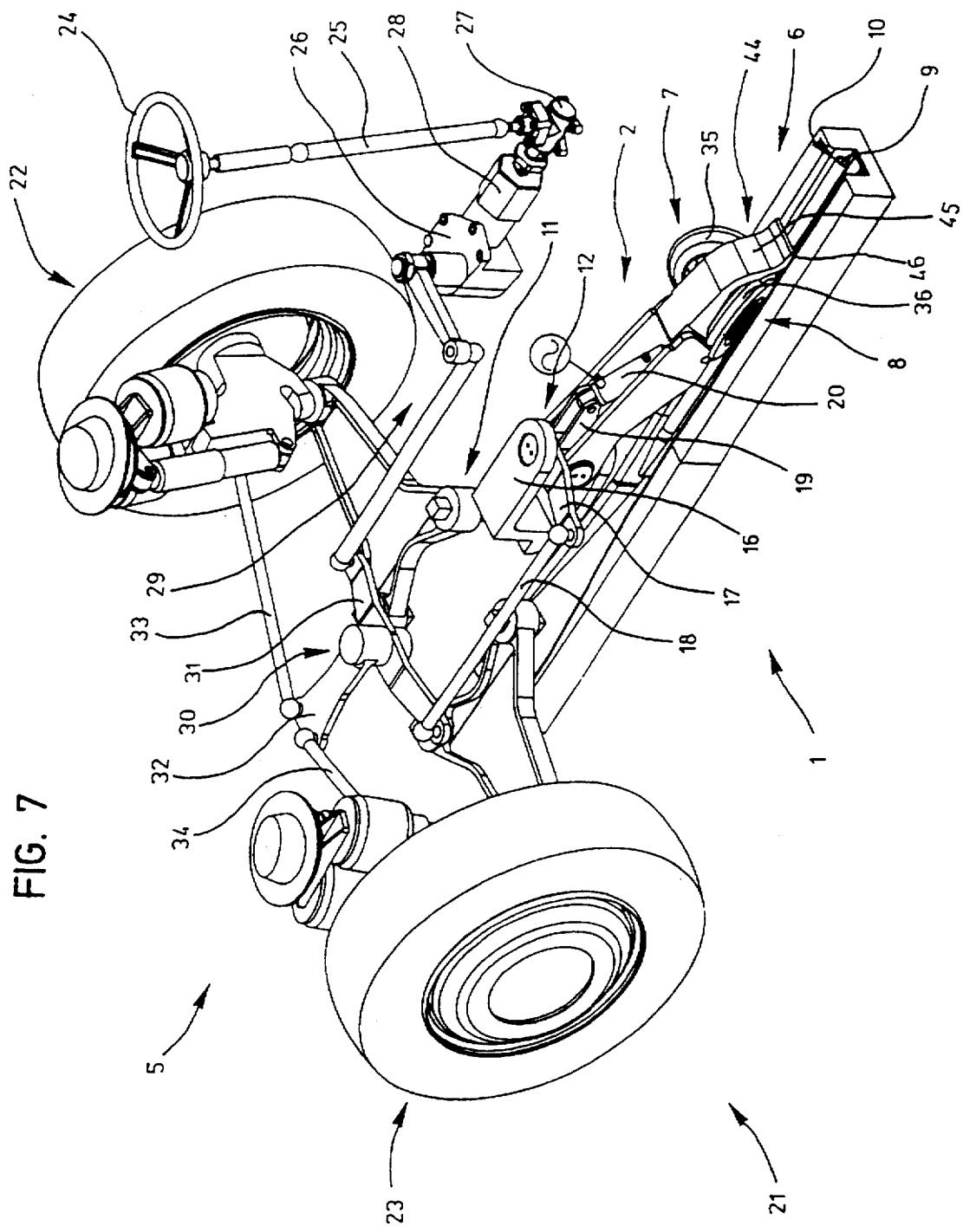
FIG. 7: a diagrammatic perspective view of an example embodiment of a complete steering unit on an urban vehicle.

In FIG. 7, the various components can be clearly seen, forming the operational steering unit of the vehicle from the driving position to the front steering unit with independent wheels or with an axle controlled in manual mode by a steering wheel 24 actuated by the driver or in self-guidance mode by the guide arm according to the form of the path imposed by the guide rail.

In this figure, the conventional components of the steering system are depicted, namely the steering wheel 24 mounted on a height-adjustable steering column 25 leading to a power steering box 26 through an angle transmission 27 followed by a homokinetic transmission 28. The output of the steering box 26 is connected by a lever/rod steering assembly 29 to a central steering pivot 30. The guide pivot 13 including the lateral lever 17 is pivotally connected by the return rod 18 to the central pivot 30. The articulated connections coming from the guide arm and from the steering wheel are mechanically coupled on each side of the central pivot 30 by a diametral plate 31. Under the effect of the manual or self-guidance control, the central pivot 30 actuates simultaneously, through a quadrant 32, a left-wheel control rod 33 and a right-wheel control rod 34.

More particularly, the front running means are produced in the form of a pair of two freely rotating guide rollers 35, 36 disposed side by side, making simultaneous close running contact with the rail.

According to a preferred arrangement, these rollers are mounted so as to rotate freely and are inclined symmetrically with respect to a vertical mid-plane passing through the arm. The above V-shaped arrangement makes it possible to follow the rail while bearing continuously on its lateral shoulders. The continuous bearing during running prevents derailment and improves stability.

To this end, the rollers are mounted close together so as to grip the rail. A slight deflection which is possible through the elastic deformation of a component part enables proper contact to be made with a squeezing effect.

Of course, each roller has a grooved profile 37 complementary to the half-profile of the rail, having regard to its inclination.

Figure 3:
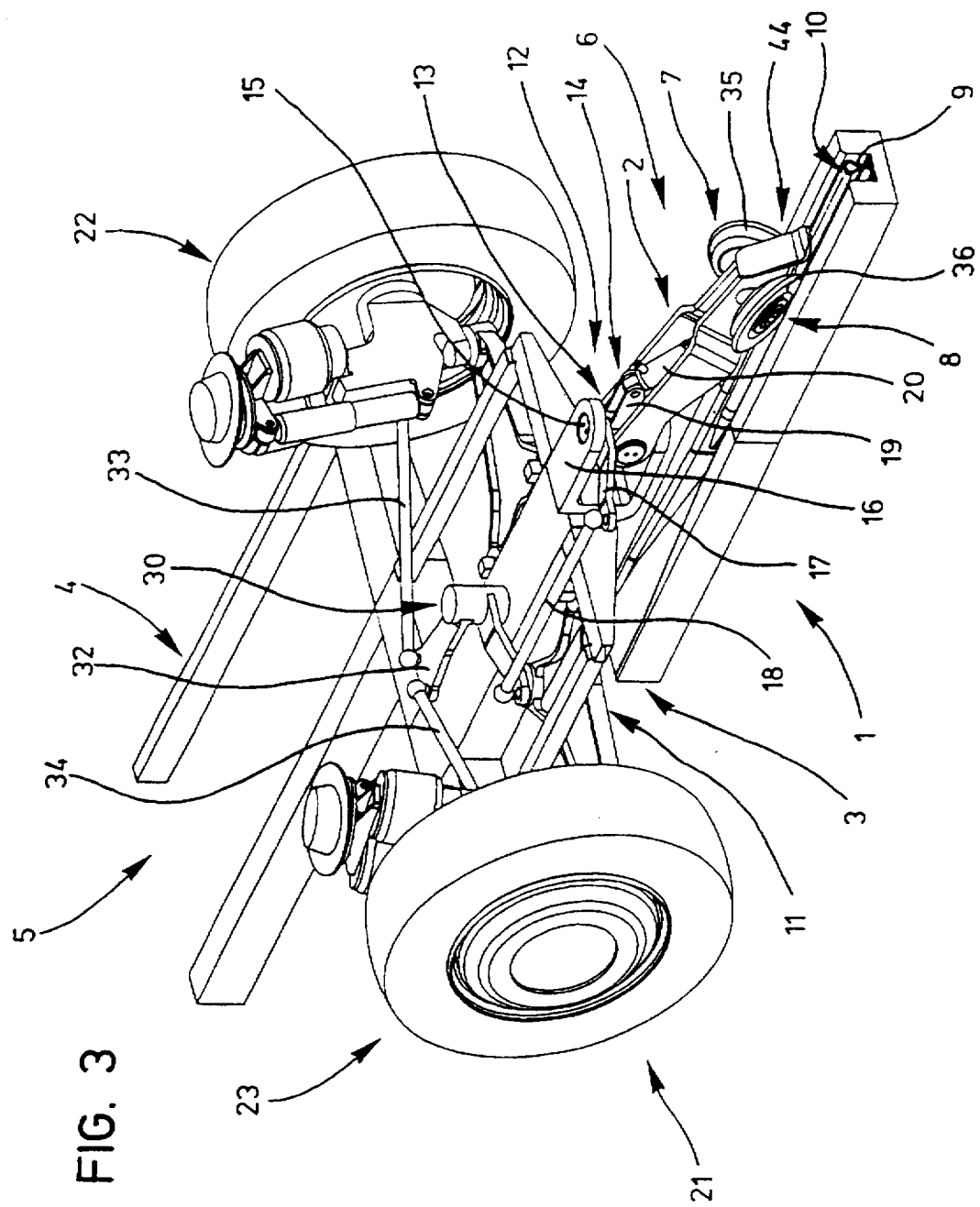
FIG. 3: a perspective view of the front of the self-guidance assembly associated with a steering unit of the vehicle, in the position of straight-line forward movement.
Figure 4:
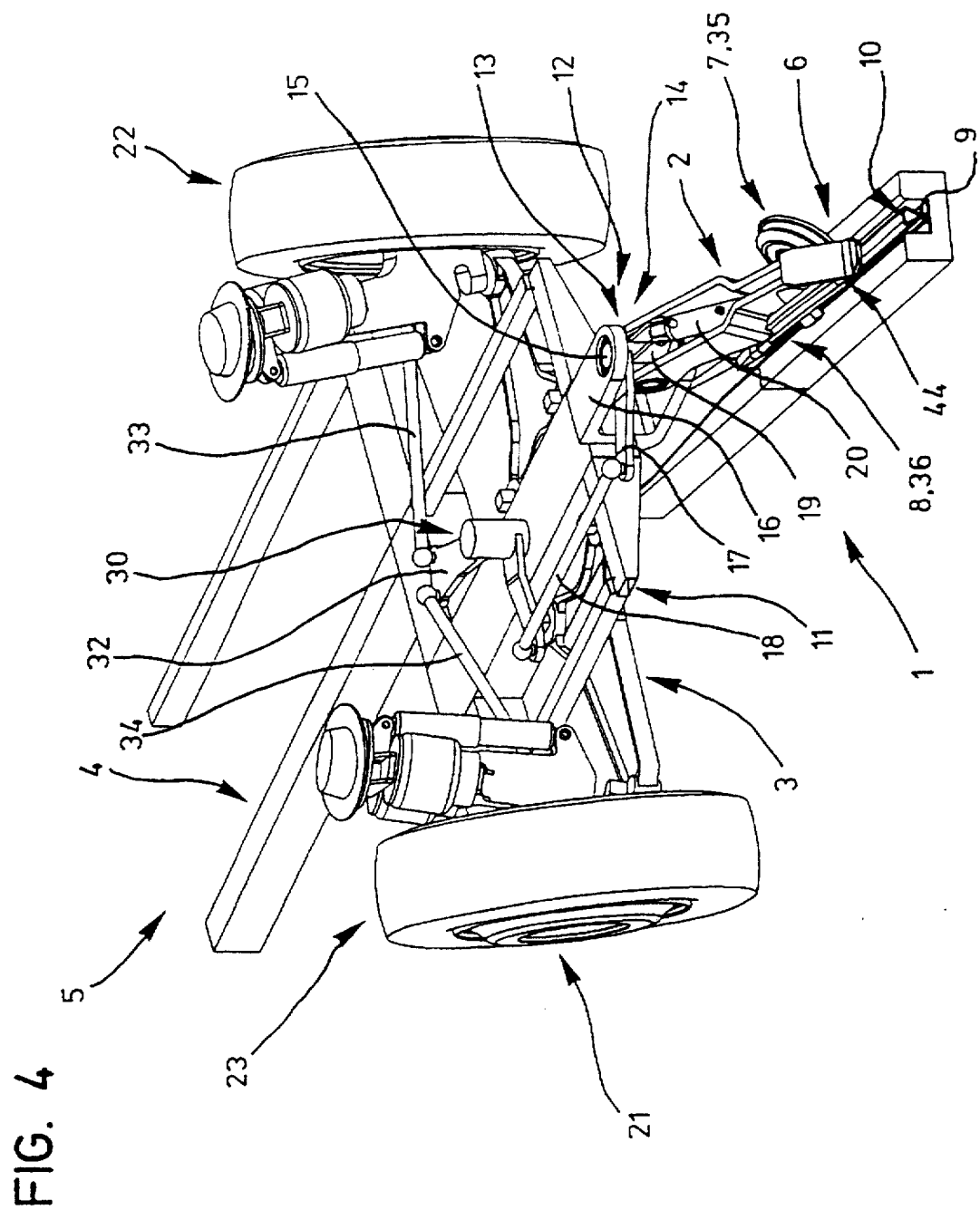
FIG. 4: a view corresponding to FIG. 3, in the turning position.
Figure 5:
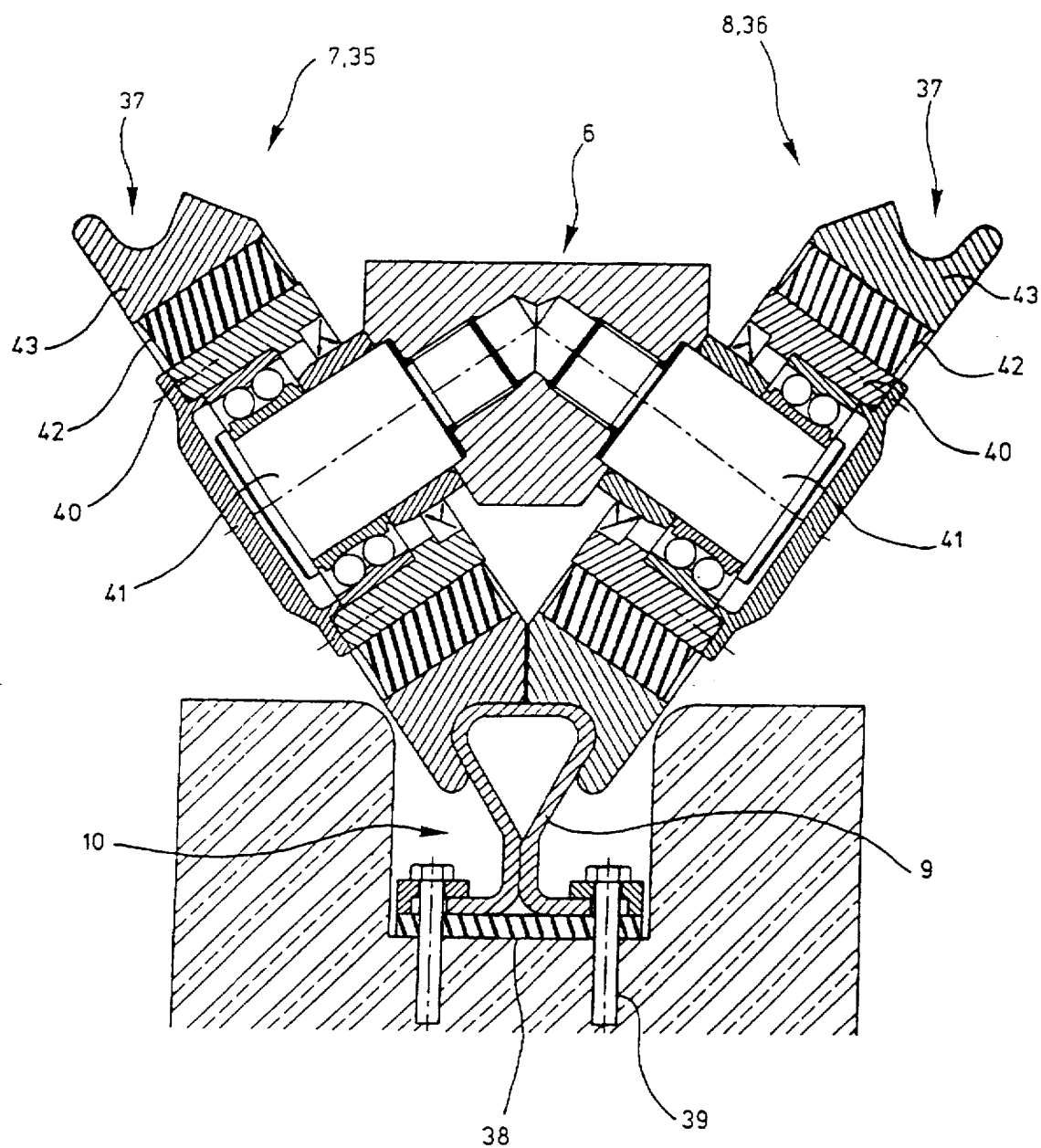
FIG. 5: a view in cross section of the self-guidance assembly and the rail, in the operating position.
Figure 6:
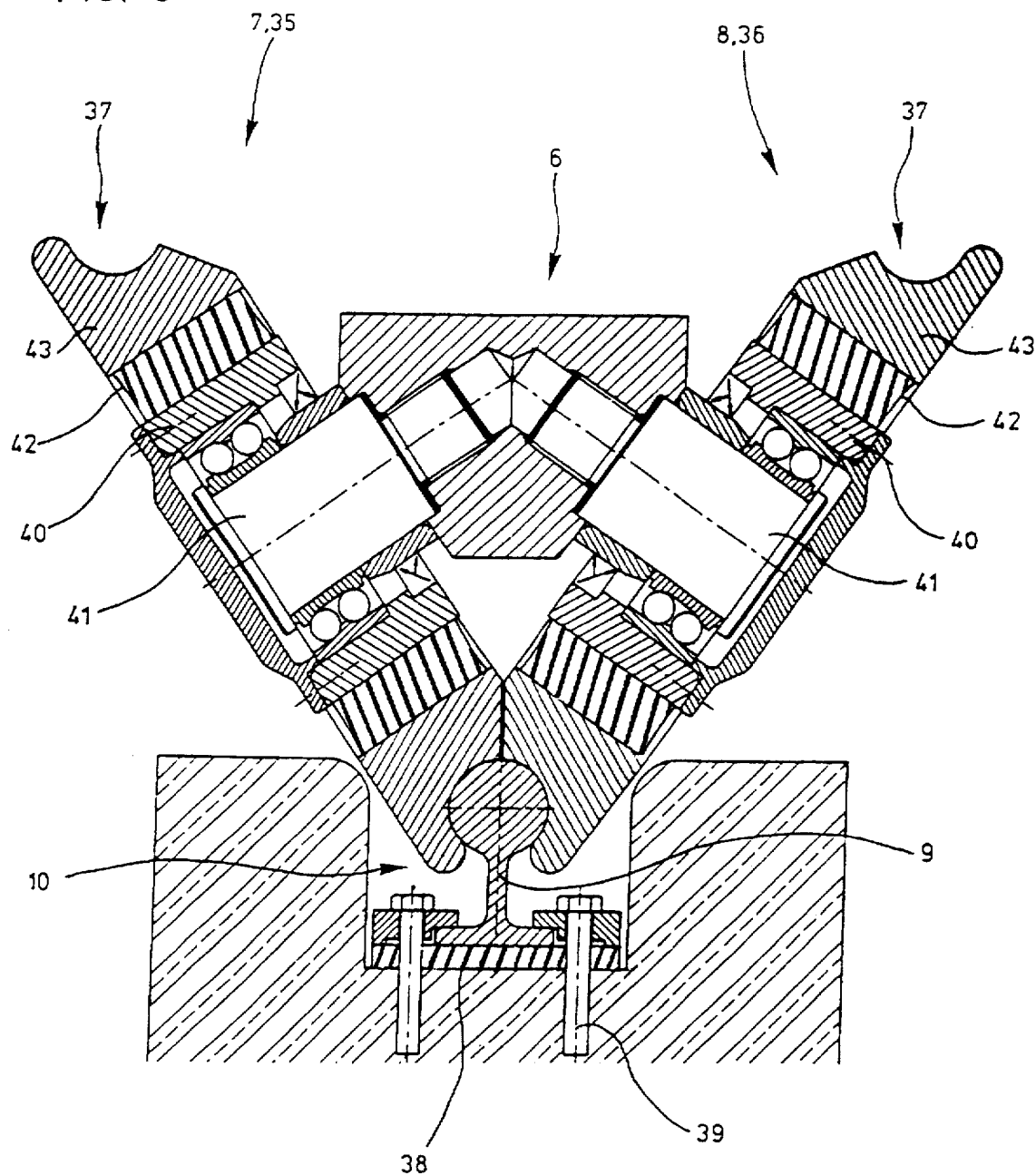
FIG. 6: a view similar to FIG. 5, with an alternative conformation of the transverse profile.

To this end, there are rail profiles that are triangular (FIGS. 3 to 5), round (FIGS. 1, 2, 6 and 7) and others, mounted at the bottom of the groove in the channel, or on the ground by applying its base to a noise-deadening backing 38 and fixing by means of anchor bolts 39.

The constitution of each of the guide rollers can vary. It will always be composite, namely a hub 40, a bearing shaft 41, a deformable central coaxial element 42 providing, by means of its deformation, the slight functional deflection, and a metal bearing ring 43 in running contact through its groove with the guide rail.

It should be noted that the guide arm is equipped at its front end with an obstacle detector known as a fender in the form of a deflector 44 designed to clear away small obstacles which could hamper passage along the rail. This deflector 44 is produced, for example, in the form of an inclined plate 45 with a horizontal return 46. According to one embodiment, the plate has an opening 47 enabling it to move along the guide rail as close as possible thereto, so as better to clear away small obstacles that have settled near the rail.

Figure 2:
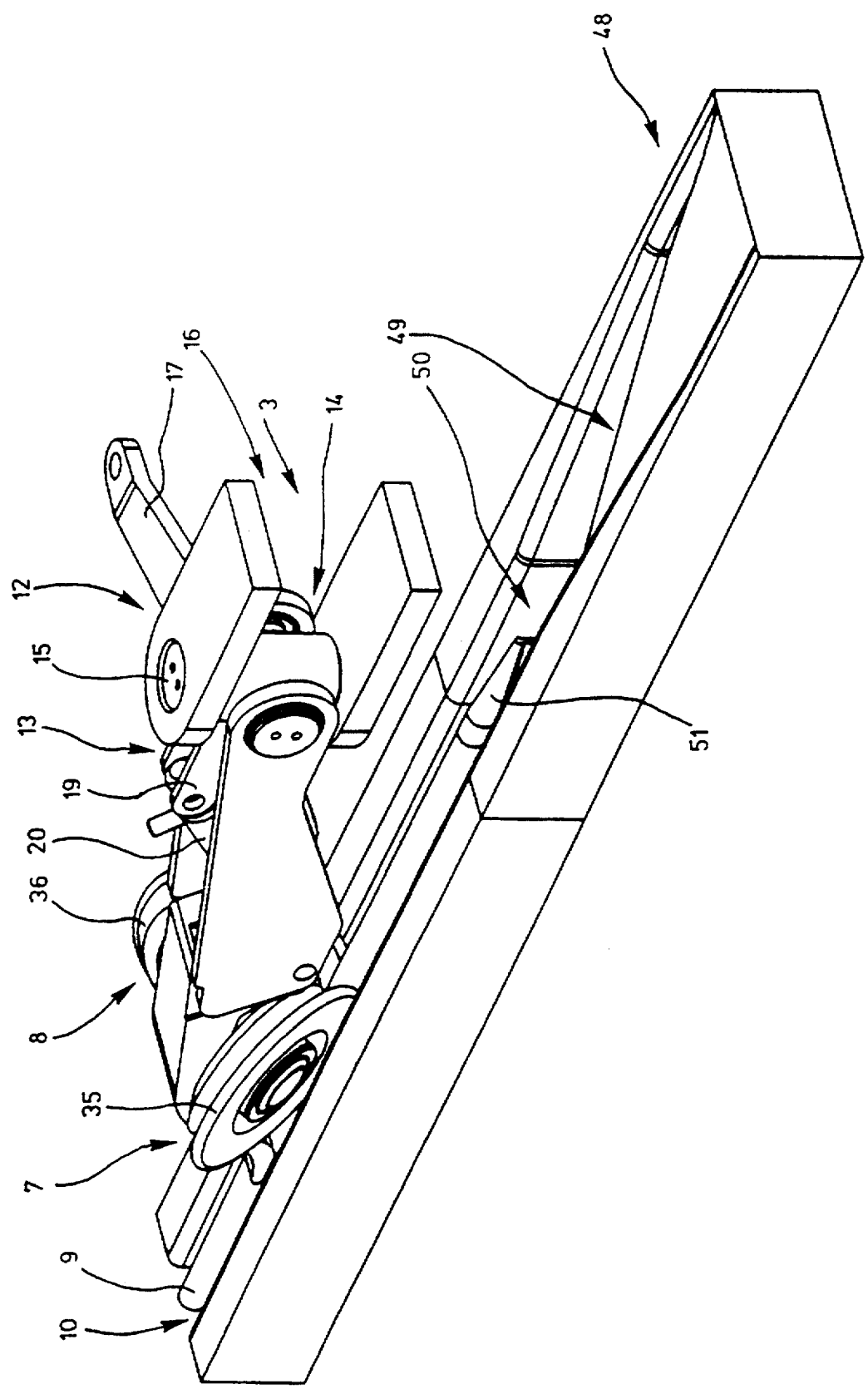
FIG. 2: a general perspective view of the rear of the self-guidance assembly.

All the sections of a journey in self-guidance mode, that is to say equipped with guide rails, start with an engagement zone 48, for example of the type depicted in FIG. 2. This engagement zone has an entry cavity 49 whose shape converges towards a central part 50 ending in an end piece 51 on the rail, facilitating the engagement of the rollers on the rail. The section ends in an escape zone, for example of the same type.

In these engagement and escape zones, guidance is effected by the outer faces of the rollers, in order to position the arm in line with the end of the rail.

Figure 8:
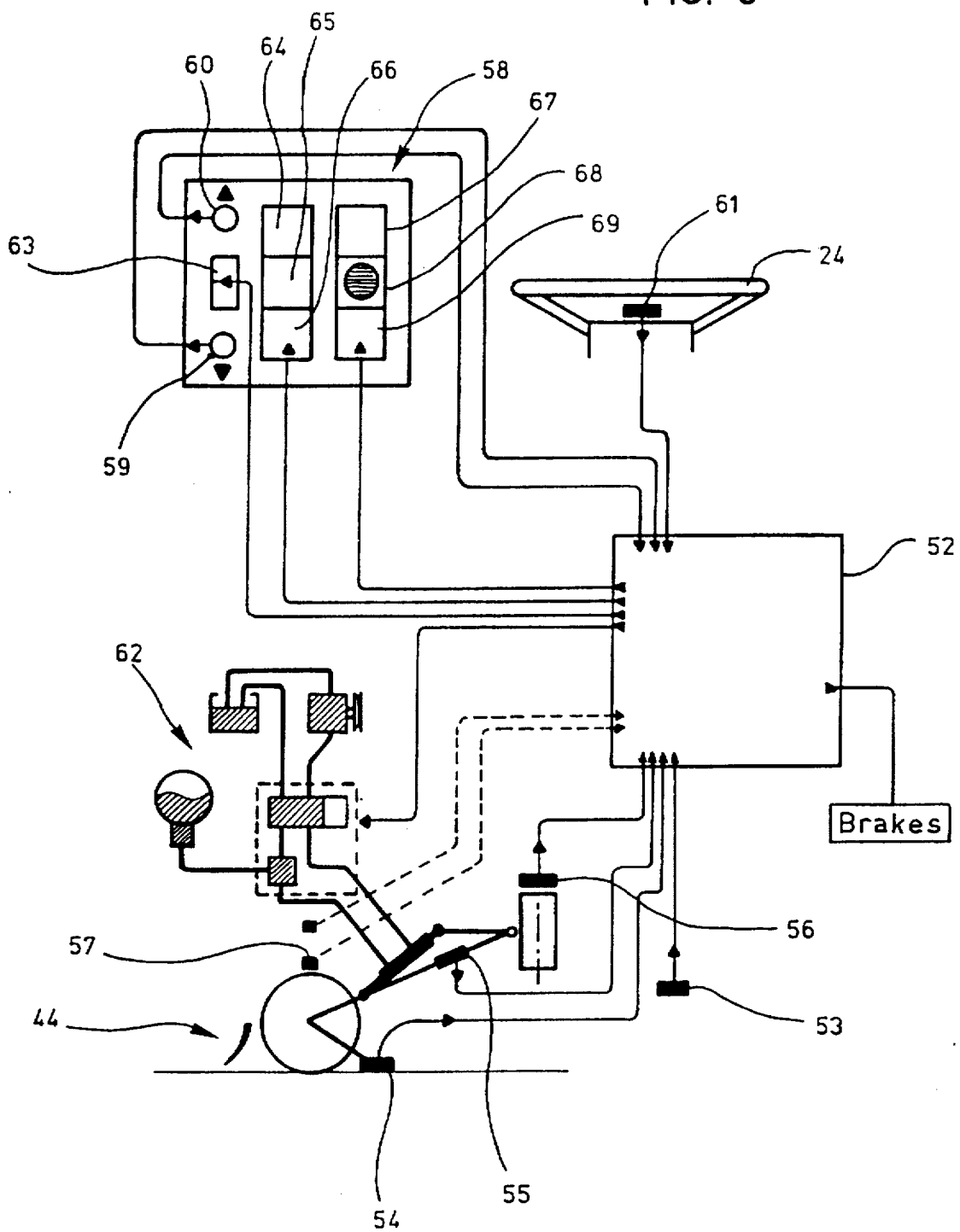
FIG. 8: a general functional control diagram of the self-guidance assembly.

The overall functioning is controlled by an automatic controller 52 which is sufficiently advanced to take certain safety decisions in place of the driver. The general operating diagram of the control from this automatic controller is depicted in FIG. 8.

The self-guidance assembly according to the invention comprises various sensors connected to the automatic controller, situated notably at the front end of the guide arm, including a speed sensor 53, a sensor 54 for the presence of the rail, a sensor 55 for the position of the arm, a sensor 56 for abnormal force on the articulation of the arm and a sensor 57 for abnormal force on the rollers.

Moreover, the automatic controller can receive instructions direct from the driver.

A display panel 58 is provided in the driving position. This display panel can, for example, include switches 59, 60 for lowering and raising the guide arm.

Furthermore, as part of the so-called "dead man's" system, a push button 61 can be provided on the hub of the steering wheel.

On the basis of the data transmitted by the sensors and the instructions supplied by the driver, the automatic controller controls the operation of the hydraulic circuit 62 actuating the guide arm cylinder, for lowering or raising, and manages the safety functions.

The automatic controller can also control the actuation of the brakes, in case of excessive speed or as part of the triggering of the so-called "dead man's" procedure.

The operating mode and characteristics are presented to the driver on the display panel by means of indicators such as a guidance indicator 63, warning indicators 64, 65 and 66, and indicators 67, 68 and 69 relating to the so-called "dead man's" system.

Where necessary, the automatic controller can, of course, be connected to a track signaling system (a function which is not depicted).

The operation of the steering/guidance system will be described hereinafter.

In manual steering mode, the vehicle drives without guidance. The driver manipulates the steering wheel which, through the manual control and common steering control, actuates the pivoting of the front wheels.

The guide arm is then in the high position, rendering the self-guidance assembly inactive, and follows the movements imposed by the steering components.

For safety reasons, the guide arm cannot be lowered, even intentionally, while the speed of the vehicle measured by the speed sensor is above a reference speed which is the maximum speed allowed for engagement on the guide rail.

If the driver inadvertently lowered the guide arm outside a guidance site, for example at a stop, a safety system operating through failure of the sensor to detect the presence of a rail after a time delay would result in the automatic raising of the arm.

For traveling in guided mode, the driver engages the vehicle in a transition zone marked by a horizontal indicator, at a maximum set speed.

Small convergent lateral runners of appropriate shape enable the vehicle to be perfectly centered.

A panel tells the driver when he must activate the control to lower the guide arm.

The guide arm is lowered and the two rollers are centered opposite the end piece on the rail, guided by their outer faces. The adapted convergent shape of the engagement zone progressively aligns the rollers on the axis of the rail and, on entry to the guide zone proper, the inner faces of the rollers engage on the rail by means of the special end piece and the elastic hubs.

The shape of the rail and the position and shape of the rollers then make any derailment impossible.

As soon as the sensor for the presence of a rail, for example a carbon shoe disposed behind the rollers, has detected the presence of the rail, the vehicle is considered to be in guidance mode.

In order to guard against any eventuality, for example excessive approach speed, inappropriate angle of approach or excessively late lowering of the guide arm, a second engagement zone can be provided at a distance from the principal zone.

If the driver has not succeeded in engaging on the rail on the first occasion, a second attempt can be made in this zone, by means of an identical procedure.

When a so-called "dead man's" system is provided, traveling in self-guidance mode takes place in a normal fashion so long as the so-called "dead man's" system detects no failure with the driving.

If the so-called "dead man's" system detects a failure in driving, the automatic controller triggers the programmed stop procedure.

Another safety device can be installed on the self-guidance assembly. This will detect any abnormal force on the guide arm, due, for example, to a deformed rail or one obstructed by an object or stone.

In this case, the sensor installed on the horizontal axis of the guide arm detects an abnormal force. The automatic controller then initiates the escape procedure.

A large force is applied to the raising cylinder on the arm in order to cause the rollers to escape by deformation of the elastic means and retract the self-guidance assembly.

An audible signal warns the driver that he must immediately resume control of the steering and apply the laid-down procedure.

On leaving the guidance zone, the vehicle travels through the escape zone whilst still being guided, and then, as soon as the sensor for the presence of a rail detects the end thereof, the automatic controller initiates the retraction of the self-guidance assembly. The vehicle is then in non-guided manual mode.

What is claimed is:

1. An assembly for self-guidance guiding a road vehicle along a guide rail, said vehicle having a steering unit for steering the vehicle, said assembly for self-guidance comprising:

a first end of a guide arm being pivotably mounted to an undersurface of the vehicle;

a pair of guide rollers being secured adjacent a second end of said guide arm, said pair of guide rollers being disposed adjacent one another and each of said pair of guide rollers having a grooved profile for mating engagement with an exterior profile of a guide rail upon which said assembly for self-guidance is to travel so that said pair of guide rollers grip and roll along the guide rail;

said guide arm being coupled to the steering unit of the vehicle to control steering thereof when said pair of guide rollers are in engagement with the guide rail; and a mechanism for lowering said pair of guide rollers into engagement with the guide rail, while the vehicle is in motion, to facilitate self-guidance of the vehicle and for raising said pair of guide rollers out of engagement with the guide rail, while the vehicle is in motion, to facilitate manual operation of the vehicle by a driver.

2. The assembly for self-guidance according to claim 1, wherein said first end of said guide arm is pivotably mounted to the undersurface of the vehicle by an articulation which allows both horizontal pivoting movement of said guide arm relative to the undersurface of the vehicle, for self-guidance of the vehicle, and vertical pivoting movement of said guide arm relative to the undersurface of the vehicle, for raising and lowering one end of said guide arm.

3. The assembly for self-guidance according to claim 2, wherein said articulation includes a clevis and said mechanism for engaging and disengaging said pair of guide rollers from said guide rail includes a piston interconnecting said second end of said guide arm with said clevis.

4. The assembly for self-guidance according to claim 2, wherein said assembly for self-guidance further comprises at least one force sensor, coupled to an automatic controller of the vehicle, to sense excessive force on one of said articulation and said pair of guide rollers to facilitate automatic control of said assembly for self-guidance.

5. The assembly for self-guidance according to claim 1, wherein said pair of rollers are freely rotatable and are inclined towards one other when approaching the guide rail so as to be located to grip continuously the guide rail when engaged therewith.

6. The assembly for self-guidance according to claim 1, wherein said pair of guide rollers are arranged in a V-shaped configuration and each of said pair of guide rollers grip the guide rail via said grooved profile.

7. The assembly for self-guidance according to claim 1, wherein said guide arm is connected to a chassis of the vehicle by a universal joint connection to facilitate horizontal and vertical pivoting movement of said guide arm.

8. The assembly for self-guidance according to claim 1, wherein the guide rail has a substantially circular shaped exterior transverse profile and said guide rollers have a corresponding substantially semi-circular shaped grooved profile.

9. The assembly for self-guidance according to claim 1, wherein the guide rail has a substantially inverted triangular shaped exterior transverse profile and said guide rollers having a corresponding substantially inverted triangular shaped grooved profile.

10. The assembly for self-guidance according to claim 1, wherein said assembly for self-guidance is directly connected to a steering linkage of the vehicle by an articulated lever and a rod assembly.

11. The assembly for self-guidance according to claim 1, wherein said assembly for self-guidance further comprises at least one force sensor, coupled to an automatic controller of the vehicle, to sense excessive force of assembly for self-guidance to facilitate automatic control of said assembly for self-guidance.

12. The assembly for self-guidance according to claim 1, wherein said assembly for self-guidance further comprises at least one sensor to sense the presence of the guide rail, coupled to an automatic controller, to facilitate automatic control of said assembly for self-guidance.

13. The assembly for self-guidance according to claim 1, wherein each of said pair of guide rollers comprises a hub which supports a rotatable bearing shaft, and a metal bearing ring is supported by said rotatable bearing shaft via a concentric central element made from a deformable and sound-absorbent material.

14. The assembly for self-guidance according to claim 1, wherein said guide arm has an obstacle deflector attached remote from the coupling of said guide arm to the steering unit to clear obstacles away from the guide rail.

15. The assembly for self-guidance according to claim 14, wherein said obstacle detector is a fender formed by an inclined plate having a horizontal return.

16. An assembly for self-guidance guiding a road vehicle along a guide rail, said vehicle having a steering wheel coupled to a steering unit for steering the vehicle, said assembly for self-guidance comprising:

a first end of a guide arm being pivotably mounted to an undersurface of the vehicle;

a pair of guide rollers being secured adjacent a second end of said guide arm, said pair of guide rollers being disposed adjacent one another and each of said pair of guide rollers having a grooved profile for mating engagement with an exterior profile of a guide rail upon which said assembly for self-guidance is to travel so that said pair of guide rollers grip and roll along the guide rail;

said guide arm being coupled to the steering unit of the vehicle to control steering thereof when said pair of guide rollers are in engagement with the guide rail;

a mechanism for moving said pair of guide rollers into engagement with the guide rail, while the vehicle is in motion, to facilitate self-guidance of the vehicle and for moving said pair of guide rollers out of engagement with the guide rail, while the vehicle is in motion, to facilitate manual operation of the vehicle by a driver manually controlling the steering unit; and the steering wheel being coupled to the steering unit, via a steering assembly, to facilitate manual steering of the vehicle by the driver operating the steering wheel.

17. The assembly for self-guidance according to claim 16, wherein both said steering assembly and said guide arm are coupled to a diametral plate of the steering unit, and the diametral plate is coupled to control rods for controlling a steering position of a pair of wheels of the vehicle.

18. An assembly for self-guidance guiding a road vehicle along a guide rail, said vehicle having a steering wheel coupled to a steering unit for steering the vehicle, said assembly for self-guidance comprising:

a first end of a guide arm being pivotably mounted to an undersurface of the vehicle;

a pair of guide rollers being secured adjacent a second end of said guide arm, said pair of guide rollers being disposed adjacent one another and each of said pair of guide rollers having a grooved profile for mating engagement with an exterior profile of a guide rail upon which said assembly for self-guidance is to travel so that said pair of guide rollers grip and roll along the guide rail;

said guide arm being coupled to the steering unit of the vehicle to control steering thereof when said pair of guide rollers are in engagement with the guide rail;

a mechanism for moving said pair of guide rollers into engagement with the guide rail, while the vehicle is in motion, to facilitate self-guidance of the vehicle and for moving said pair of guide rollers out of engagement with the guide rail, while the vehicle is in motion, to facilitate manual operation of the vehicle by a driver manually controlling the steering unit; and a controller for controlling said mechanism for moving said pair of guide rollers into and out of engagement with the guide rail, and said controller being operable by one of the driver and an automatic controller during travel of the vehicle.

19. The assembly for self-guidance according to claim 18, wherein said controller is an automatic controller which receives an input from at least one sensor for controlling operation of said assembly for self-guidance.

* * * * *

UNITED STATES PATENT AND TRADEMARK OFFICE
CERTIFICATE OF CORRECTION

PATENT NO. : 5,758,583
DATED : June 2, 1998
INVENTOR(S) : Robert LOHR

It is certified that error appears in the above-identified patent and that said Letters Patent is hereby corrected as shown below:

Column 1, Title page, under section [30] Foreign Application Priority Data
replace "May 26, 1994 [FR] France.....93 06491"
with "May 26, 1993 [FR] France.......93 06491"

Signed and Sealed this

Twenty-second Day of September, 1998

Attest:

BRUCE LEHMAN

Attesting Officer      Commissioner of Patents and Trademarks